United States Patent
Yang et al.

(10) Patent No.: US 11,032,805 B2
(45) Date of Patent: *Jun. 8, 2021

(54) METHOD FOR TRANSMITTING WIRELESS SIGNAL AND DEVICE THEREFOR

(71) Applicant: LG ELECTRONICS INC., Seoul (KR)

(72) Inventors: Suckchel Yang, Seoul (KR); Yunjung Yi, Seoul (KR); Joonkui Ahn, Seoul (KR); Bonghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/660,767

(22) Filed: Oct. 22, 2019

(65) Prior Publication Data
US 2020/0053726 A1 Feb. 13, 2020

Related U.S. Application Data

(63) Continuation of application No. 14/771,159, filed as application No. PCT/KR2014/002121 on Mar. 13, 2014, now Pat. No. 10,477,524.
(Continued)

(51) Int. Cl.
*H04W 72/04* (2009.01)
*H04L 5/00* (2006.01)
(Continued)

(52) U.S. Cl.
CPC ......... *H04W 72/0413* (2013.01); *H04J 11/00* (2013.01); *H04L 1/1812* (2013.01);
(Continued)

(58) Field of Classification Search
CPC ...... H04W 76/00; H04W 88/08; H04W 72/04
See application file for complete search history.

(56) References Cited

U.S. PATENT DOCUMENTS 9,337,979 B2 * 5/2016 Guo .................. H04W 72/04
10,477,524 B2 11/2019 Yang et al.
(Continued)

FOREIGN PATENT DOCUMENTS

CN 101702631 5/2010
CN 101960736 1/2011
(Continued)

OTHER PUBLICATIONS

The State Intellectual Property Office of the People's Republic of China Application Serial No. 201480014280.X, Office Action dated Jul. 20, 2017, 8 pages.
(Continued)

*Primary Examiner* — Hassan A Phillips
*Assistant Examiner* — Prenell P Jones
(74) *Attorney, Agent, or Firm* — Lee Hong Degerman Kang & Waimey

(57) ABSTRACT

The present invention relates to a wireless communication system. Particularly, the present invention relates to a method for receiving control information in a wireless communication system and a device therefor, the method comprising the steps of: receiving a PDCCH signal including uplink scheduling information; transmitting a PUSCH signal by using the uplink scheduling information; and receiving a PHICH signal including acknowledgement information on the PUSCH signal, wherein an RS for the PUSCH signal exists only in one slot per RB pair within an RB set in which the PUSCH signal is transmitted, and a resource for receiving the PHICH signal is determined by using an index of the slot in which the RS exists.

6 Claims, 13 Drawing Sheets

Related U.S. Application Data

(60) Provisional application No. 61/780,856, filed on Mar. 13, 2013, provisional application No. 61/808,615, filed on Apr. 4, 2013, provisional application No. 61/811,128, filed on Apr. 12, 2013, provisional application No. 61/817,350, filed on Apr. 30, 2013.

(51) Int. Cl.
| | | |
|---|---|---|
| *H04L 1/18* | (2006.01) | |
| *H04W 72/12* | (2009.01) | |
| *H04J 11/00* | (2006.01) | |
| *H04W 74/00* | (2009.01) | |

(52) U.S. Cl.
CPC .......... *H04L 5/0048* (2013.01); *H04L 5/0055* (2013.01); *H04L 5/0094* (2013.01); *H04W 72/04* (2013.01); *H04W 72/0446* (2013.01); *H04W 72/1268* (2013.01); *H04W 74/006* (2013.01)

(56) References Cited

U.S. PATENT DOCUMENTS

| | | | |
|---|---|---|---|
| 2010/0041350 A1* | 2/2010 | Zhang | H04L 5/0023 455/101 |
| 2011/0128942 A1 | 6/2011 | Kim et al. | |
| 2011/0310726 A1 | 12/2011 | Di et al. | |
| 2012/0057551 A1 | 3/2012 | Kim et al. | |
| 2012/0170524 A1 | 7/2012 | Ren et al. | |
| 2012/0236816 A1 | 9/2012 | Park et al. | |
| 2013/0034028 A1 | 2/2013 | Chen et al. | |
| 2013/0039284 A1 | 2/2013 | Marinier et al. | |
| 2013/0058304 A1 | 3/2013 | Kim et al. | |
| 2013/0058307 A1 | 3/2013 | Kim et al. | |
| 2013/0114461 A1 | 5/2013 | Seo et al. | |
| 2013/0189930 A1* | 7/2013 | Kinnunen | H04L 5/0051 455/67.11 |
| 2014/0078972 A1* | 3/2014 | Sorrentino | H04J 13/0074 370/329 |
| 2014/0211736 A1* | 7/2014 | Noh | H04W 56/0005 370/329 |
| 2014/0369286 A1* | 12/2014 | Noh | H04W 72/1278 370/329 |
| 2015/0103796 A1 | 4/2015 | Chung et al. | |
| 2016/0006548 A1 | 1/2016 | Yang et al. | |
| 2016/0192385 A1* | 6/2016 | Tooher | H04L 5/0048 370/336 |
| 2017/0026955 A1* | 1/2017 | Noh | H04W 72/0413 |
| 2018/0324837 A1* | 11/2018 | Tooher | H04W 72/0446 |

FOREIGN PATENT DOCUMENTS

| | | |
|---|---|---|
| CN | 102113255 | 6/2011 |
| CN | 102474376 | 5/2012 |
| CN | 102668482 | 9/2012 |
| CN | 102858016 | 1/2013 |
| CN | 102577209 | 4/2017 |
| EP | 2306667 | 4/2011 |
| KR | 10-2009-0028401 | 3/2009 |
| KR | 20100017051 | 2/2010 |
| KR | 10-2012-0025994 | 3/2012 |
| KR | 10-2012-0062820 | 6/2012 |
| WO | 2010053984 | 5/2010 |
| WO | 2010131929 | 11/2010 |
| WO | 2011159624 | 12/2011 |
| WO | 2012050372 | 4/2012 |
| WO | 2012070672 | 5/2012 |
| WO | 2012109542 | 8/2012 |
| WO | 2012/118334 | 9/2012 |

OTHER PUBLICATIONS

European Patent Office Application Serial No. 14764367.0, Search Report dated Sep. 9, 2016, 9 pages.
3rd Generation Partnership Project (3GPP), "Technical Specification Group Radio Access Network; Evolved Universal Terrestrial Radio Access (E-UTRA); Physical layer procedures (Release 11)," 3GPP TS 36.213 V11.1.0, Dec. 2012, 160 pages.
3rd Generation Partnership Project (3GPP), "Technical Specification Group Radio Access Network; Evolved Universal Terrestrial Radio Access (E-UTRA); Physical Channels and Modulation (Release 11)," 3GPP TS 36.211 V11.1.0, Dec. 2012, 108 pages.
China Telecom, "Discussion on spectral efficiency improvement for small cell enhancements," 3GPP TSG-RAN WG1 #72, R1-130354, Jan. 2013, 6 pages.
PCT International Application No. PCT/KR2014/002119, Written Opinion of the International Searching Authority dated Jun. 20, 2014, 21 pages.
European Patent Office Application Serial No. 14763552.8, Search Report dated Dec. 22, 2016, 8 pages.
United States Patent and Trademark Office U.S. Appl. No. 14/770,785, Office Action dated Nov. 16, 2016, 17 pages.
State Intellectual Property Office of the People's Republic of China Application Serial No. 201480015133.4, Office Action dated Sep. 30, 2017, 16 pages.
CATT, "Overhead reduction for spectrum efficiency improvement," 3GPP TSG RAN WG1 Meeting #72, R1-130057, Jan. 2013, 4 pages.
Texas Instruments, "UL considerations for Small Cell Enhancements," 3GPP TSG RAN WG1 #72, R1-130663, Jan. 2013, 3 pages.
ZTE, "Downlink DMRS redunction for small cell," 3GPP TSG RAN WG1 Meeting #72, R1-130138, Jan. 2013, 5 pages.
Nokia, et al., "Evaluation Assumptions on Schemes to Enhance Small Cell Spectral Efficiency," 3GPP TSG RAN WG1 Meeting #72, R1-130491, Jan. 2013, 4 pages.
PCT International Application No. PCT/KR2014/002121, Written Opinion of the International Searching Authority dated Jul. 8, 2014, 14 pages.
PCT International Application No. PCT/KR2014/002121, Written Opinion of the International Searching Authority dated Jul. 8, 2014, 18 pages.
United States Patent and Trademark Office U.S. Appl. No. 14/771,159, Office Action dated Jan. 8, 2019, 6 pages.
United States Patent and Trademark Office U.S. Appl. No. 14/771,159, Final Office Action dated Jun. 29, 2018, 10 pages.
United States Patent and Trademark Office U.S. Appl. No. 14/771,159, Office Action dated Dec. 1, 2016, 16 pages.

\* cited by examiner

* PUSCH may be transmitted with/without UL-SCH data.
* If the PUSCH allocation is made as a part of random access procedure, no UCI transmission is transmitted in subframe #n.

METHOD FOR TRANSMITTING WIRELESS SIGNAL AND DEVICE THEREFOR

CROSS-REFERENCE TO RELATED APPLICATIONS

This application is a continuation of U.S. patent application Ser. No. 14/771,159, filed on Aug. 27, 2015, now U.S. Pat. No. 10,477,524, which is the National Stage filing under 35 U.S.C. 371 of International Application No. PCT/KR2014/002121, filed on Mar. 13, 2014, which claims the benefit of U.S. Provisional Application No. 61/780,856, filed on Mar. 13, 2013, 61/808,615, filed on Apr. 4, 2013, 61/811,128, filed on Apr. 12, 2013 and 61/817,350, filed on Apr. 30, 2013, the contents of which are all hereby incorporated by reference herein in their entirety.

TECHNICAL FIELD

The present invention relates to a wireless communication system and, more particularly, to a method of transmitting/receiving a wireless signal and a device therefor.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method and device for efficiently transmitting/receiving a wireless signal in a wireless communication system.

The technical problems solved by the present invention are not limited to the above technical problems and other technical problems which are not described herein will become apparent to those skilled in the art from the following description.

Technical Solution

The object of the present invention can be achieved by providing a method for receiving a control information at a user equipment (UE) in a wireless communication system including receiving a physical downlink control channel (PDCCH) signal including an uplink scheduling information, transmitting a physical uplink shared channel (PUSCH) signal using the uplink scheduling information, and receiving a physical hybrid ARQ indicator channel (PHICH) including acknowledgement information for the PUSCH signal, wherein a reference signal (RS) for the PUSCH signal exists only in one slot per resource block (RB) pair within an RB set in which the PUSCH signal is transmitted, and wherein a resource for receiving the PHICH signal is determined using an index of a slot in which the RS exists.

In another aspect of the present invention, provided herein is a user equipment (UE) configured to receive control information in a wireless communication system including a radio frequency (RF) unit, and a processor, wherein the processor is configured to receive a physical downlink control channel (PDCCH) signal including an uplink scheduling information, to transmit a physical uplink shared channel (PUSCH) signal using the uplink scheduling information, and to receive a physical hybrid ARQ indicator channel (PHICH) including an acknowledgement information for the PUSCH signal, wherein a reference signal (RS) for the PUSCH signal exists only in one slot per resource block (RB) pair within an RB set in which the PUSCH signal is transmitted, and wherein a resource for receiving the PHICH signal is determined using an index of a slot in which the RS exists.

The RS may be configured to alternately exist in different slots within the RB set according to RB index, and the resource for receiving the PHICH signal may be determined using the index of the slot, in which the RS exists, in a specific RB of the RB set.

The specific RB may have a lowest index within the RB set.

The RB index may be indexed based on all RBs within system bandwidth.

The RB index may be indexed based on RBs of the RB set.

The index of the slot, in which the RS exists, may indicate an offset used in a process of determining at least one of a PHICH group index and a PHICH sequence index.

Advantageous Effects

According to embodiments of the present invention, it is possible to efficiently transmit/receive a wireless signal in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
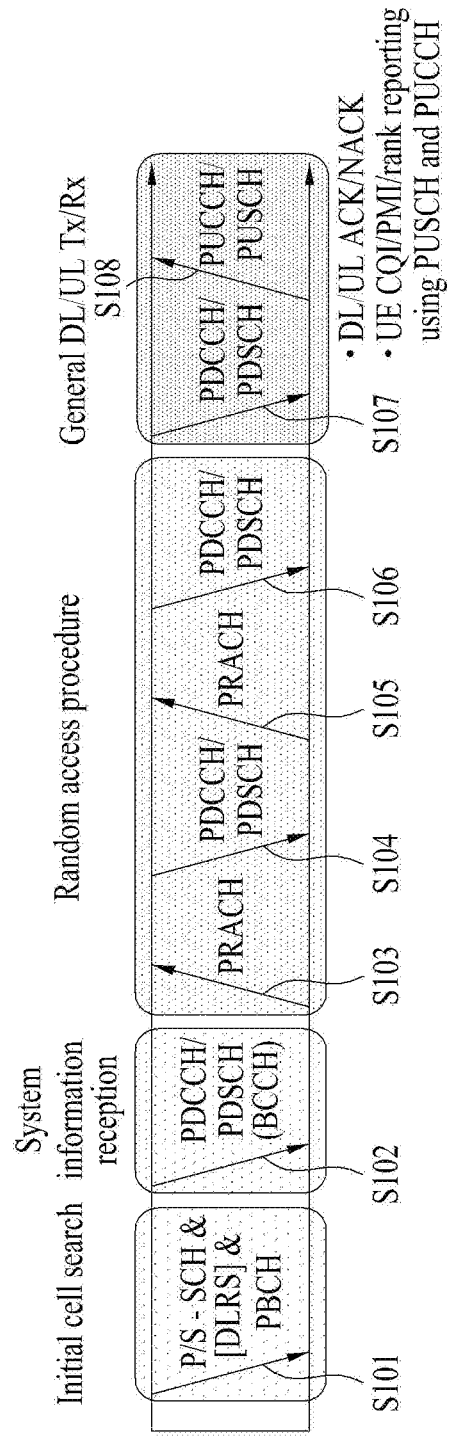
FIG. 1 illustrates physical channels used in a 3GPP LTE system as an exemplary wireless communication system and a signal transmission method using the same.

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is evolved from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

The terms used in the specification are described.

Demodulation reference signal (DMRS) symbol: Indicates an SC-FDMA symbol, on which a DMRS for PUSCH demodulation is transmitted, in a subframe, to which a PUSCH is allocated. This is also referred to as a DMRS SC-FDMA symbol. In this specification, the SC-FDMA symbol may be replaced with an OFDMA symbol.

Non-DMRS symbol: Indicates an SC-FDMA symbol, on which a DMRS for PUSCH demodulation is not transmitted, in a subframe, to which a PUSCH is allocated. This is also referred to as a non-DMRS SC-FDMA symbol. The non-DMRS symbol includes an uplink control information (UCI) symbol and a sounding reference signal (SRS) symbol, for example. The UCI symbol indicates an SC-FDMA symbol, on which UCI (e.g., ACK/NACK and/or RI) is transmitted, in a subframe, to which a PUSCH is allocated. The SRS symbol indicates an SC-FDMA symbol reserved for SRS transmission in a cell-specific SRS subframe (e.g., a last SC-FDMA symbol of a subframe).

Legacy DMRS: Indicates a legacy structure in which a DMRS for PUSCH transmission is transmitted in LTE/LTE-A. For convenience, the legacy DMRS indicates a structure in which two DMRSs are transmitted per subframe ((that is, one DMRS is transmitted per slot) (see FIG. 8).

DMRS variance: Indicates that, as compared to the legacy DMRS, fewer time resources (e.g., SC-FDMA symbols) or frequency resources (e.g., subcarriers) are used for PUSCH demodulation (hereinafter, reduced DMRS) or more time resources (e.g., SC-FDMA symbols) or frequency resources (e.g., subcarriers) are used for PUSCH demodulation (hereinafter, increased DMRS).

RB pair: An RB pair indicates two neighboring RBs in the time domain of a subframe unless otherwise stated. That is, the PR pair includes an RB of a first RB and an RB of a second slot and the two RBs have the same RB index. The RB pair may be indicated by an RB index.

In a wireless communication system, a UE receives information from a BS on downlink (DL) and transmits information to the BS on uplink (UL). Information transmitted/received between the UE and BS includes data and various types of control information, and various physical channels are present according to type/purpose of information transmitted/received between the UE and BS.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement (ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be periodically transmitted through a PUSCH at the request/instruction of a network.

Figure 2:
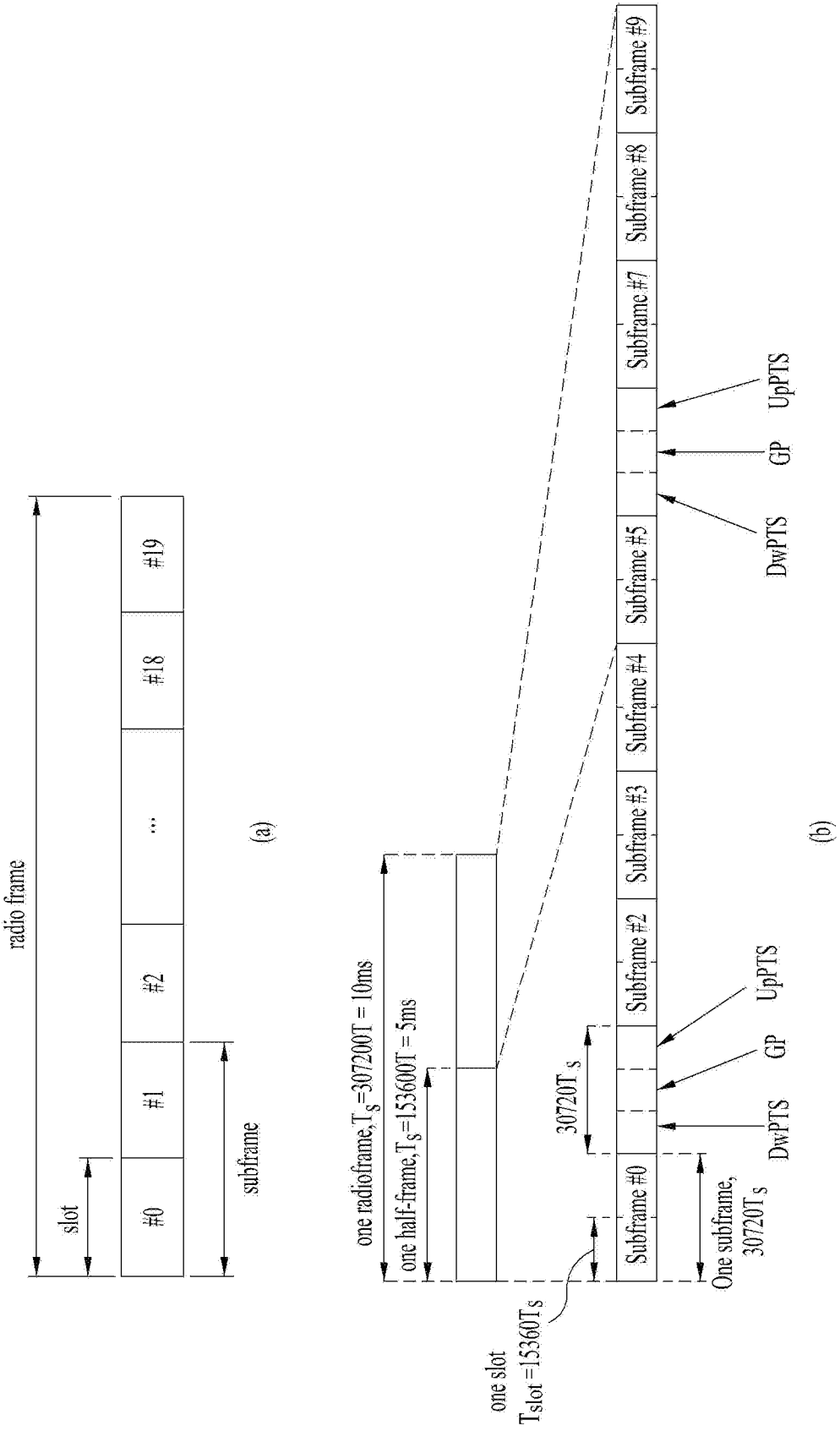
FIG. 2 illustrates a radio frame structure.

FIG. 2 illustrates a radio frame structure. In a cellular OFDM wireless packet communication system, uplink/downlink data packet transmission is performed on a sub-frame-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 2(a) illustrates a type-1 radio frame structure. A downlink subframe includes 10 subframes each of which includes 2 slots in the time domain. A time for transmitting a subframe is defined as a transmission time interval (ITI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be κ. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 5 subframes, a Downlink Pilot Time Slot (DwPTS), a Guard Period (GP), and an Uplink Pilot Time Slot (UpPTS), and one subframe consists of 2 slots. The DwPTS is used for initial cell search, synchronization or channel estimation. The UpPTS is used for channel estimation in a BS and UL transmission synchronization acquisition in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
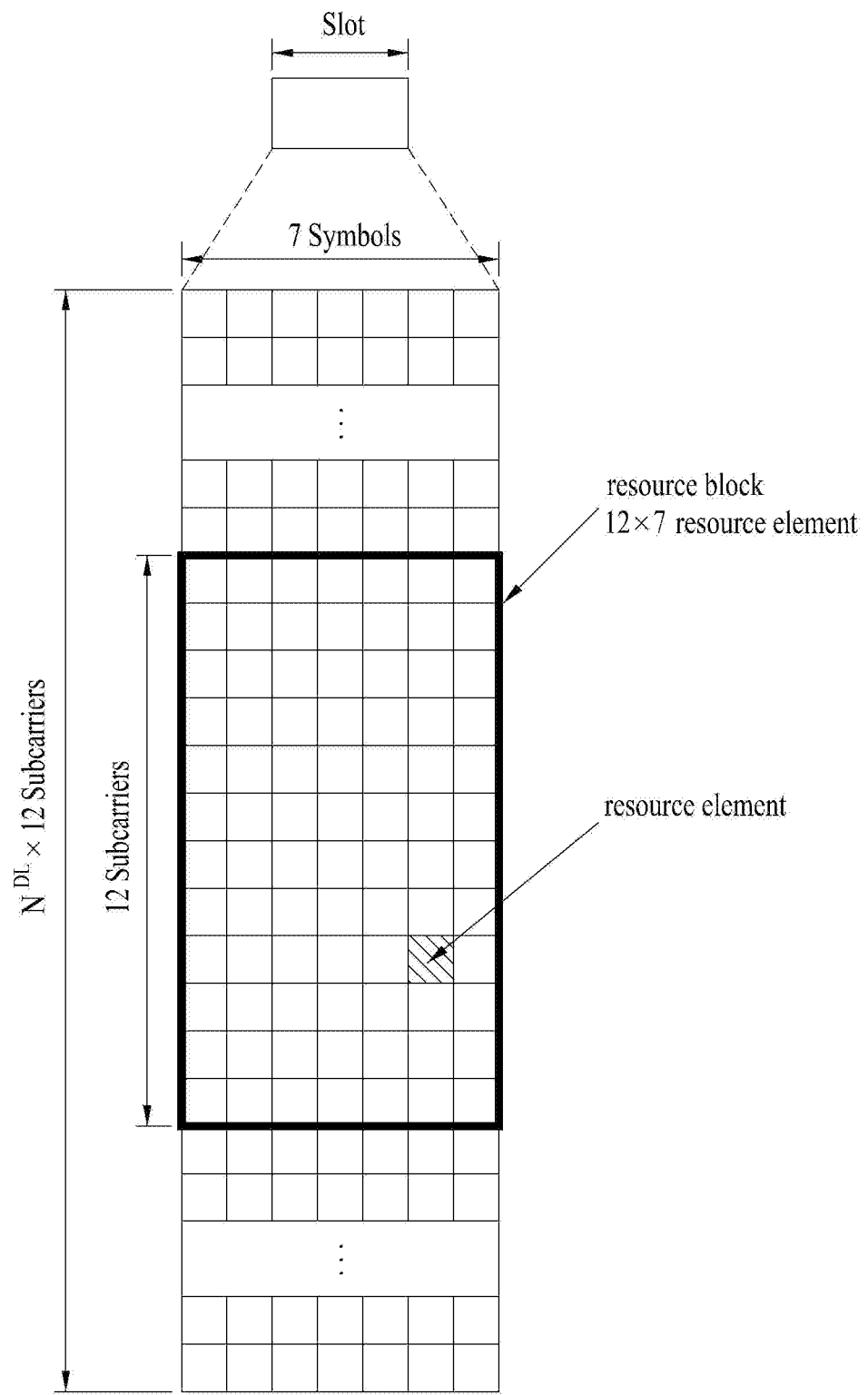
FIG. 3 illustrates a resource grid of a downlink slot.

FIG. 3 illustrates a resource grid of a downlink slot.

Referring to FIG. 3, a downlink slot includes a plurality of OFDM symbols in the time domain. One downlink slot may include $N^{DL}_{symb}$ (e.g., 7(6)) OFDM symbols and a resource block may include 12 subcarriers in the frequency domain. Each element of a resource grid is referred to as a resource element (RE). One RB includes 12×7(6) REs. The number $N^{DL}_{RB}$ of RBs included in the downlink slot depends on downlink transmission band. k denotes a subcarrier index (k=0, 1, . . . ) and l denotes an OFDM symbol index ((l=0, 1, . . . , $N^{DL}_{symb}$−1). The structure of the uplink slot is equal to that of the downlink slot, except that the OFDM symbol is replaced with the SC-FDM symbol, $N^{DL}_{symb}$ is replaced with $N^{UL}_{symb}$, and $N^{DL}_{RB}$ is replaced with $N^{UL}_{RB}$.

Figure 4:
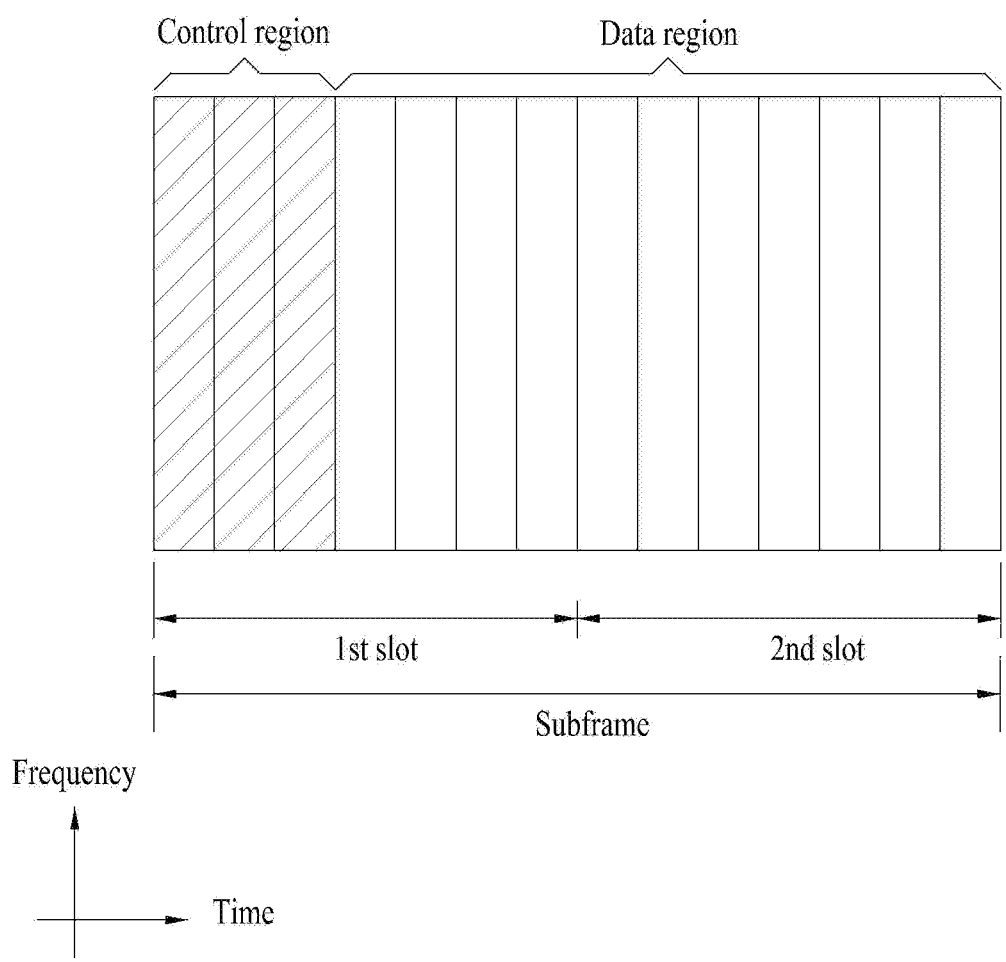
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. The DCI formats selectively include information such as hopping flag, RB allocation, MCS (Modulation Coding Scheme), RV (Redundancy Version), NDI (New Data Indicator), TPC (Transmit Power Control), cyclic shift DM RS (Demodulation Reference Signal), CQI (Channel Quality Information) request, HARQ process number, TPMI (Transmitted Precoding Matrix Indicator), PMI (Precoding Matrix Indicator) confirmation according as necessary.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

In LTE/LTE-A, a CCE set, in which a PDCCH may be located for each UE, was defined. A CCE set, in which a UE may find a PDCCH thereof, may be referred to as a PDCCH search space (SS) or an SS. An individual resource in which a PDCCH may be transmitted in the SS is referred to as a PDCCH candidate. One PDCCH candidate corresponds to 1, 2, 4 or 8 CCEs according to CCE aggregation level. An eNB transmits a real PDCCH (DCI) via an arbitrary PDCCH candidate in the SS and a UE monitors the SS in order to find the PDCCH (DCI). More specifically, the UE attempts blind decoding (BD) with respect to PDCCH candidates in the SS. A UE-specific search space (USS) and a common search space (CSS) are defined. The USS is individually configured for each UE and the CSS is commonly configured for all UEs within a cell.

Figure 5:
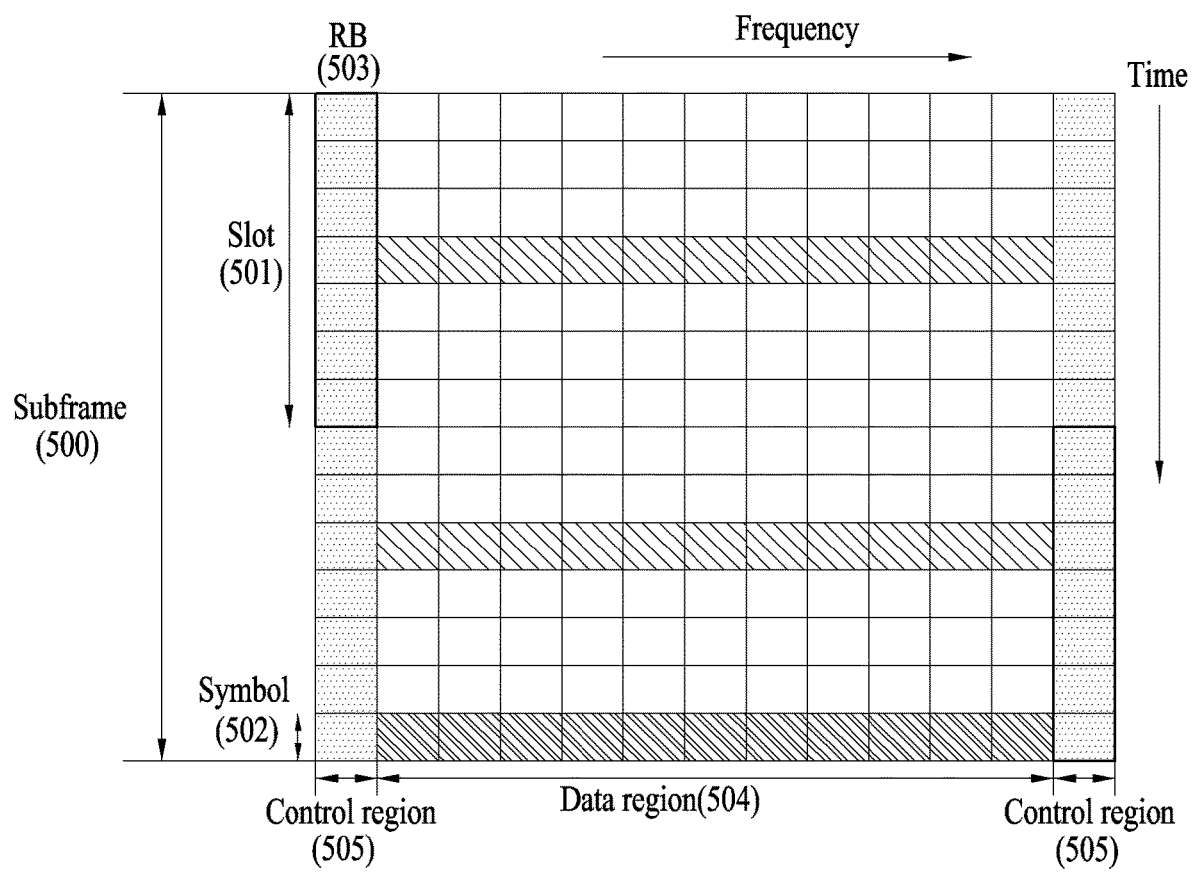
FIG. 5 is a diagram showing the structure of an uplink subframe.

FIG. 5 is a diagram showing the structure of an uplink subframe used in LTE/LTE-A.

Referring to FIG. 5, the uplink subframe includes a plurality (e.g., 2) of slots. The slot may include SC-FDMA symbols, the number of which is changed according to CP length. The uplink subframe may be divided into a control region and a data region in the frequency domain. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary.

The UCI includes the following control information.

Scheduling request (SR): Information used to request uplink (UL)-SCH resources. This is transmitted using an on-off keying (OOK) method.

HARQ ACK information: Response signal to downlink data packets on a PDSCH. This indicates whether downlink data packets have been successfully received. 1-bit ACK/NACK is transmitted in response to a single downlink codeword (CW) and 2-bit ACK/NACK is transmitted in response to two downlink codewords.

Channel state information (CSI): Feedback information for a downlink channel. This includes channel quality indicator (CQI), rank indicator (RI), precoding matrix indicator (PMI), precoding type indicator (PTI), etc. 20 bits are used per subframe.

Figure 6:
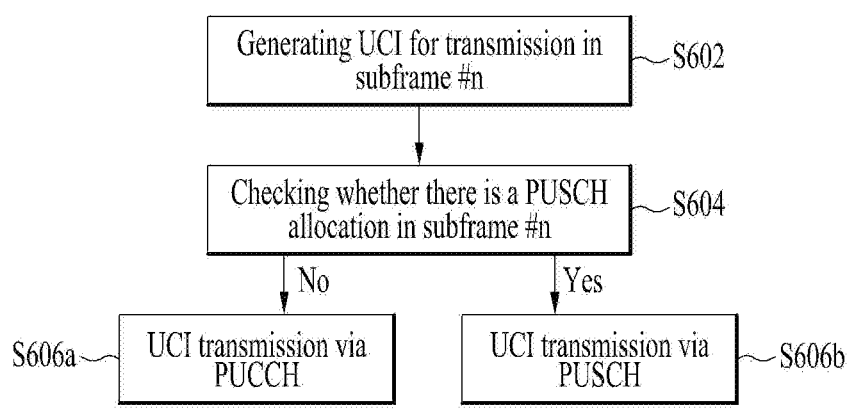
FIG. 6 is a diagram showing channel allocation for uplink control information (UCI) transmission.

FIG. 6 is a diagram showing a channel allocation process for uplink control information (UCI) transmission.

Referring to FIG. 6, a UE generates UCI for transmission in subframe #n (S602). Here, the UCI includes at least one of CQI/PMI, HARQ-ACK and RI. Thereafter, the UE checks whether there is a PUSCH allocation in subframe #n (S604). PUSCH allocation may be performed by semi-persistent scheduling (SPS) or UL grant DCI. If there is no PUSCH allocation in subframe #n, the UCI is transmitted via a PUCCH (S606a) and, when there is a PUSCH allocation, the UCI is transmitted via a PUSCH (S606b). For convenience, transmitting the UCI via the PUSCH is referred to as PUSCH piggybacking. The PUSCH may include UL-SCH data or may not include UL-SCH data if the PUSCH is allocated only for CQI transmission. If the PUSCH is allocated as a part of a random access procedure, the UCI is not transmitted in subframe #n.

Figure 7:
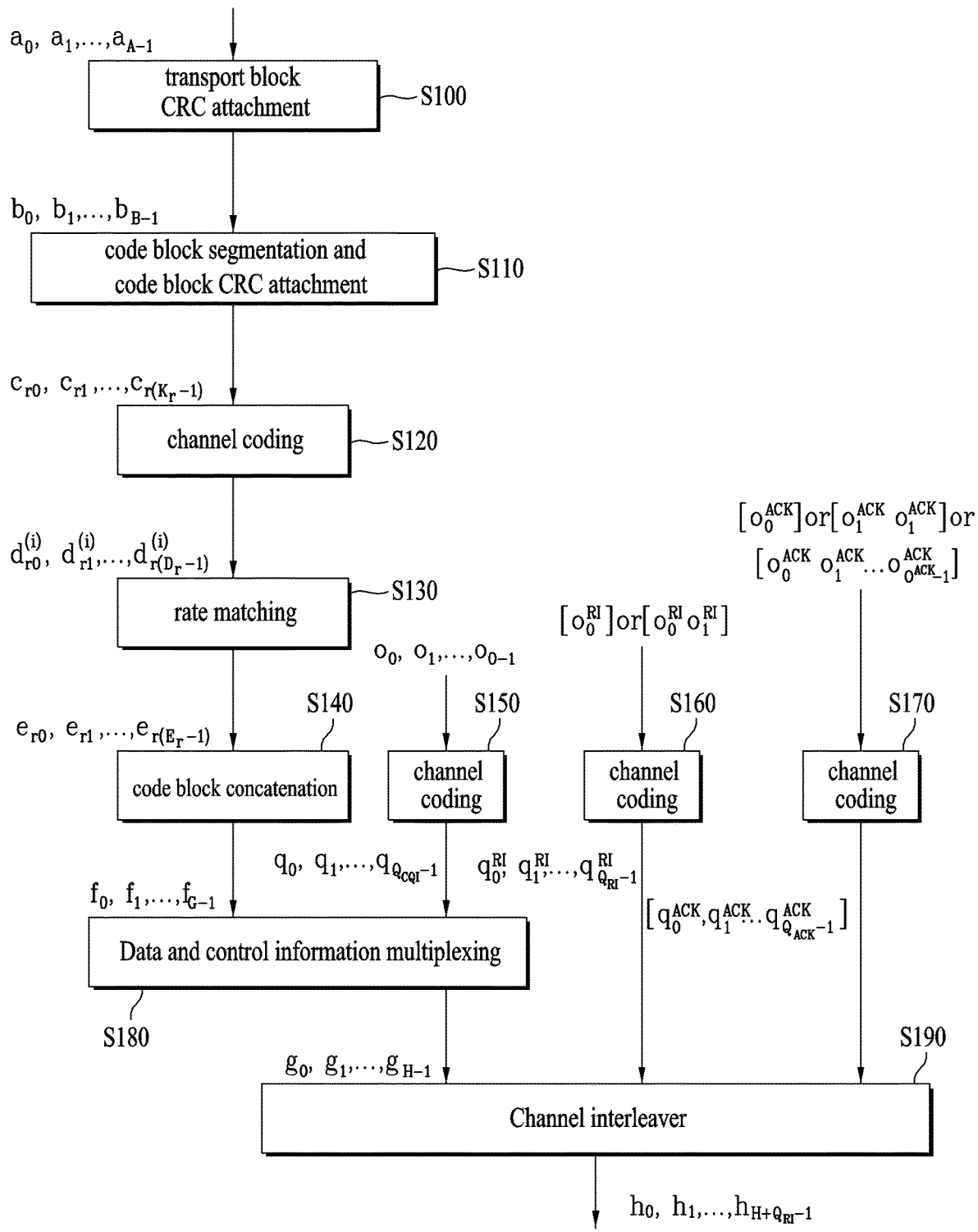
FIG. 7 is a diagram showing a procedure of processing uplink shared channel (UL-SCH) data and control information.

FIG. 7 is a diagram showing a procedure of processing uplink shared channel (UL-SCH) data and control information. For a detailed procedure, refer to 36.212 V8.8.0 (2009, December) 5.2.2 to 5.2.2.8.

Referring to FIG. 7, error detection is provided to a UL-SCH transport block (TB) via cyclic redundancy check (CRC) attachment (S100).

All transport blocks are used to calculate CRC parity bits. The bits of the transport blocks are $a_0, a_1, a_2, a_3, \ldots, a_{A-1}$. The parity bits are $p_0, p_1, p_2, p_3, \ldots, p_{L-1}$. The size of the transport block is A and the number of parity bits is L.

After transport block CRC attachment, code block segmentation and code block CRC attachment are performed (S110). Bits input for code block segmentation are $b_0, b_1, b_2, b_3, \ldots, b_{B-1}$. B denotes the number of bits of the transport block (including CRC). The bits after code block segmentation are $c_{r0}, c_{r1}, c_{r2}, c_{r3}, \ldots c_{r(K_r-1)}$, r denotes a code block number (r=0, 1, ..., C−1) and Kr denotes the number of bits of the code block r. C denotes a total number of code blocks.

Channel coding is performed after code block segmentation and code block CRC (S120). Bits after channel coding are $d_{r0}^{(i)}, d_{r1}^{(i)}, d_{r2}^{(i)}, d_{r3}^{(i)}, \ldots, d_{r(D_r-1)}^{(i)}$. i=0, 1, 2 and $D_r$ denotes the number of bits of an i-th coded stream for the code block r (that is, $D_r = K_r + 4$). r denotes a code block number (r=0, 1, ..., C−1) and Kr denotes the number of bits of the code block r. C denotes a total number of code blocks. For channel coding, turbo coding may be used.

Rate matching is performed after channel coding (S130). The bits after rate matching are $e_{r0}, e_{r1}, e_{r2}, e_{r3}, \ldots, e_{r(E_r-1)}$. $E_r$ denotes the number of rate-matched bits of an r-th code block. r=0, 1, ..., C−1 and C denotes a total number of code blocks.

Code block concatenation is performed after rate matching (S140). The bits after code block concatenation are $f_0, f_1, f_2, f_3, \ldots, f_{G-1}$. G denotes a total number of coded bits for transmission. If control information is multiplexed with UL-SCH transmission, bits used to transmit control information are not included in G. $f_0, f_1, f_2, f_3, \ldots, f_{G-1}$ correspond to a UL-SCH codeword.

In case of UCI, channel coding of channel quality information (CQI and/or PMI) $o_0, o_1, \ldots, o_{O-1}$, RI ($[o_0^{RI}]$ or $[o_0^{RI} o_1^{RI}]$) and HARQ-ACK ($[o_0^{ACK}], [o_0^{ACK} o_1^{ACK}]$ or $[o_0^{ACK} o_1^{ACK} \ldots o_{O^{ACK}-1}^{ACK}]$) is independently performed (S150 to S170). Channel coding of UCI is performed based on the number of coded symbols for control information. For example, the number of coded symbols may be used for rate matching of coded control information. The number of coded symbols corresponds to the number of modulation symbols, the number of REs, etc. in a subsequent process.

Channel coding of HARQ-ACK is performed using an input bit sequence $[o_0^{ACK}]$, $[o_0^{ACK} o_1^{ACK}]$ or $[o_0^{ACK} o_1^{ACK} \ldots o_{O^{ACK}-1}^{ACK}]$ of step S170. $[o_0^{ACK}]$ and $[o_0^{ACK} o_1^{ACK}]$ denote 1-bit HARQ-ACK and 2-bit HARQ-ACK, respectively. In addition, $[o_0^{ACK} o_1^{ACK} \ldots o_{O^{ACK}-1}^{ACK}]$ indicates HARQ-ACK composed of information of two or more bits (That is, $O^{ACK}>2$). ACK is coded into 1 and NACK is coded into 0. In case of 1-bit HARQ-ACK, repetition coding is used. In case of 2-bit HARQ-ACK, a (3, 2) simplex code is used and encoded data may be cyclically repeated. In case of HARQ-ACK of 3 or more bits, a (32, 0) block code is used.

Input of a data/control multiplexing block is $f_0, f_1, f_2, f_3, \ldots, f_{G-1}$ meaning coded UL-SCH bits and $q_0, q_1, q_2, q_3, \ldots, q_{Q_{CQI}-1}$ meaning coded CQI/PMI bits (S180). Output of the data/control multiplexing block $g_0, g_1, g_2, g_3, \ldots, g_{H'-1}$. $g_i$ denotes a column vector having a length of $Q_m$ (i=0, ..., H'−1). $H'=H/Q_m$ and $H=(G+Q_{CQI})$. H denotes a total number of bits allocated for UL-SCH data and CQI/PMI.

Thereafter, at least one of output of the data/control multiplexing block $g_0, g_1, g_2, \ldots, g_{H'-1}$, coded rank indicators $q_0^{RI}, q_1^{RI}, q_2^{RI}, \ldots, q_{Q'_{RI}-1}^{RI}$ and coded HARQ-ACK $q_0^{ACK}, q_1^{ACK}, q_2^{ACK}, \ldots, q_{Q'_{ACK}-1}^{ACK}$ is multiplexed by a channel interleaver (S190). $g_i$ denotes a column vector having a length of $Q_m$ for CQI/PMI and i=0, ..., H'−1 ($H'=H/Q$). $q_i^{ACK}$ denotes a column vector having a length of $Q_m$ for ACK/NACK and i=0, ..., $Q'_{ACK}-1$ ($Q'_{ACK}=Q_{ACK}/Q_m$). $q_i^{RI}$ denotes a column vector having a length of $Q_m$ for RI and i=0, ..., $Q'_{RI}-1$ ($Q'_{RI}=Q_{RI}/Q_m$). The channel interleaver is used to implement time-first mapping of modulation symbols in association with resource mapping for PUSCH.

Although not limited thereto, the output bit sequence of the channel interleaver may be obtained by the process of Table 1.

TABLE 1

(1) Assign $C_{mux} = N_{symb}^{PUSCH}$ to be the number of columns of a matrix. The columns of the matrix are numbered $0, 1, 2, \ldots, C_{mux} - 1$ from left to right.
$N_{symb}^{PUSCH}$ is the number of SC-FDMA symbols per subframe for PUSCH transmission and given by $N_{symb}^{PUSCH} = (2 \cdot (N_{symb}^{UL} - 1) - N_{SRS})$, where $N_{SRS}$ is equal to 1 if UE is configured to send PUSCH and SRS in the same subframe or if the PUSCH resource allocation is even partially overlaps with cell-specific SRS subframe/bandwidth. Otherwise $N_{SRS}$ is equal to 0. $N_{symb}^{UL}$ is 7 for a normal CP and 6 for an extended CP.

(2) The number of rows of the matrix is $R_{mux} = (H'' \cdot Q_m)/C_{mux}$ and we define $R_{mux}' = R_{mux}/Q_m$.
The rows of the rectangular matrix are numbered $0, 1, 2, \ldots, R_{mux} - 1$ from top to bottom.
$H'' = H' + Q_{RI}'$.

(3) If rank information is transmitted in this subframe, the vector sequence $\underline{q}_0^{RI}, \underline{q}_1^{RI}, \underline{q}_2^{RI}, \ldots, \underline{q}_{Q_{RI}'-1}^{RI}$, is written onto the columns indicated by Table 2, and by sets of Qm rows starting from the last row and moving upwards according to the following pseudocode.
Set i, j to 0.
Set r to $R_{mux}' - 1$
while $i < Q_{RI}'$
    $c_{RI}$ = Column Set( j)
    $\underline{y}_{r \times C_{mux} + c_{RI}} = \underline{q}_i^{RI}$
    i = i + 1
    r = $R_{mux}' - 1 - \lfloor i/4 \rfloor$
    j = (j + 3)mod 4
end while
Where ColumnSet is given in Table 2 and indexed left to right from 0 to 3.

(4) Write the input vector sequence, for k = 0, 1, . . . , H' − 1, into the ($R_{mux} \times C_{mux}$) matrix by sets of Qm rows starting with the vector $\underline{y}_0$ in column 0 and rows 0 to ($Q_m - 1$) and skipping the matrix entries that are already occupied:

$$\begin{bmatrix} \underline{y}_0 & \underline{y}_1 & \underline{y}_2 & \cdots & \underline{y}_{C_{mux}-1} \\ \underline{y}_{C_{mux}} & \underline{y}_{C_{mux}+1} & \underline{y}_{C_{mux}+2} & \cdots & \underline{y}_{2C_{mux}-1} \\ \vdots & \vdots & \vdots & \ddots & \vdots \\ \underline{y}_{(R'_{mux}-1) \times C_{mux}} & \underline{y}_{(R'_{mux}-1) \times C_{mux}+1} & \underline{y}_{(R'_{mux}-1) \times C_{mux}+2} & \cdots & \underline{y}_{(R'_{mux} \times C_{mux}-1)} \end{bmatrix}$$

The pseudocode is as follows:
Set i, k to 0.
  While k < H',
    if $\underline{y}_i$ is not assigned to RI symbols
    $\underline{y}_i = \underline{g}_k$
    k = k + 1
  end if
  i = i + 1
end While (5) If HARQ-ACK information is transmitted in this subframe, the vector sequence $\underline{q}_0^{ACK}, \underline{q}_1^{ACK}, \underline{q}_2^{ACK}, \ldots, \underline{q}_{Q_{ACK}'-1}^{ACK}$ is written onto the columns indicated by Table 3, and by sets of Qm rows starting from the last row and moving upwards according to the following pseudocode. Note that this operation overwrites some of the channel interleaver entries obtained in step (4).
Set i, j to 0.
Set r to $R_{mux}' - 1$
while $i < Q_{ACK}'$
    $c_{ACK}$ = Column Set( j)
    $\underline{y}_{r \times C_{mux} + c_{ACK}} = \underline{q}_i^{ACK}$
    i = i + 1
    r = $R_{mux}' - 1 - \lfloor i/4 \rfloor$
    j = (j + 3)mod 4
end while
Where ColumnSet is given in Table 3 and indexed left to right from 0 to 3.

(6) The output of the block interleaver is the bit sequence read out column by column from the ($R_{mux} \times C_{mux}$) matrix. The bits after channel interleaving are denoted by $h_0, h_1, h_2, \ldots, h_{H+Q_{RI}}-1$.

Table 2 shows a column set for insertion of HARQ-ACK information and RI.

TABLE 2

| CP configuration | HARQ-ACK Column Set | RI Column Set |
| --- | --- | --- |
| Normal | {2, 3, 8, 9} | {1, 4, 7, 10} |
| Extended | {1, 2, 6, 7} | {0, 3, 5, 8} |

After channel interleaving, a bit sequence $h_0, h_1, h_2, \ldots, h_{H+Q_{RI}-1}$ read from a channel interleaver matrix row by row is output. The read bit sequence is subjected to scrambling, modulation, discrete Fourier transform (DFT) precoding, power control, etc. and then is mapped on a resource grid. $H''=H'+Q'_{RI}$ modulation symbols are transmitted via a subframe. When the demodulation symbol sequence after DFT precoding is defined as $z(0), \ldots, z(M_{symb}-1), z(0), \ldots, z(M_{symb}-1)$ is multiplied by a power control parameter $\beta_{PUSCH}$ for transmit power control and then is sequentially mapped to physical resource bocks (PRBs) allocated for PUSCH transmission, starting from z(0). z(i) is mapped to RE(k, l) corresponding to a PRB for PUSCH transmission, and is sequentially mapped in ascending order of k and then is sequentially mapped in ascending order of l, starting from the first slot of the subframe. k denotes a subcarrier index and l denotes an SC-FDMA symbol index. An RE for DMRS and an RE reserved for SRS are excluded from mapping. An RE for DMRS is RE(k, l) having l=3 in each slot in normal CP and RE(k, l) having l=6 in each slot in extended CP. The RE reserved for SRS is RE(k, l) having l=6 in a second slot in normal CP and RE(k, l) having l=5 in the second slot in extended CP.

Figure 8:
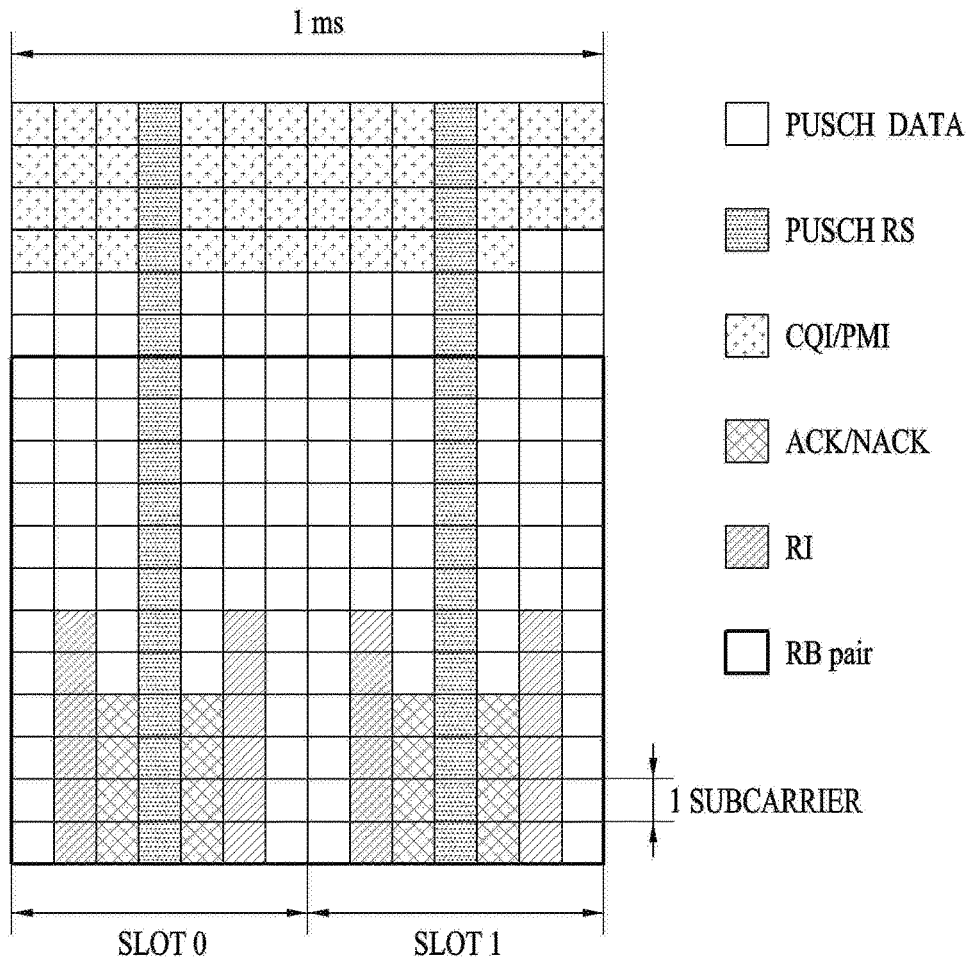
FIG. 8 is a diagram showing multiplexing of control information and UL-SCH data on a physical uplink shared channel (PUSCH).

FIG. 8 is a diagram showing multiplexing of control information and UL-SCH data on a physical uplink shared channel (PUSCH). The PUSCH may be transmitted without the UL-SCH. The control information includes at least one of CQI and/or PMI (CQI/PMI), HARQ ACK/NACK and RI. The control information is mapped to two slots of the subframe.

Referring to FIG. 8, CQI/PMI resources are located at a start portion of UL-SCH data resources, are sequentially mapped to all SC-FDMA symbols on one subcarrier and then are mapped to a next subcarrier. CQI/PMI is mapped in a subcarrier from the left to the right, that is, in ascending order of SC-FDMA symbol indices. PUSCH data (UL-SCH data) is subjected to rate matching in consideration of the amount of CQI/PMI resources (that is, the number of coded symbols). The same modulation order as the UL-SCH data is used for CQI/PMI. ACK/NACK is inserted into some of SC-FDMA resources, to which UL-SCH data is mapped, via puncturing. ACK/NACK is located beside an RS and is filled in SC-FDMA symbols from bottom to top, that is, in ascending order of subcarrier indices. In the subframe, regardless of ACK/NACK transmission, the RI is located beside the SC-FDMA symbol for ACK/NACK. More specifically, in normal CP, the DMRS may be mapped to SC-FDMA symbol #3/#10, ACK/NACK may be mapped to SC-FDMA symbol #2/4/9/11 and the RI may be mapped to SC-FDMA symbol #1/5/8/12. In extended CP, the DMRS may be mapped to SC-FDMA symbol #2/#8, ACK/NACK may be mapped to SC-FDMA symbol #1/3/7/9 and the RI may be mapped to SC-FDMA symbol #0/4/6/10. The SC-FDMA symbol index is 0, 1, ..., $N_{sub}-1$ and $N_{sub}$ denotes the number of SC-FDMA symbols located in a subframe. $N_{sub}$ is 14 in normal CP and 12 in extended CP.

The DMRS sequence is distinguished by a cyclic shift (CS) value and the CS value is indicated by a DMRS CS field in UL grant (e.g., DCI format 0/4) corresponding to PUSCH transmission. DCI format 0 includes scheduling information for single antenna port transmission and DCI format 4 includes scheduling information for multiple antenna port transmission (e.g., spatial multiplexing). If DCI format 4 is used, the value of the DMRS CS field in DCI format is mapped to CS parameter and orthogonal cover code (OCC) as shown in Table 3. If DCI format 0 is used, the value of the DMRS CS field is fixed to OCC=[1 1].

TABLE 3

| CS Field in uplink-related DCI format | $n_{DMRS,\lambda}^{(2)}$ | | | | $[w^{(\lambda)}(0)\ w^{(\lambda)}(1)]$ | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] | where, $n_{DMRS,\lambda}^{(2)}$ denotes a CS parameter used to determine the CS value of the DMRS. $\lambda$ denotes a layer index. A first value of OCC is multiplied by the DMRS of a first slot and a second value of OCC is multiplied by the DMRS of a second slot.

Figure 9:
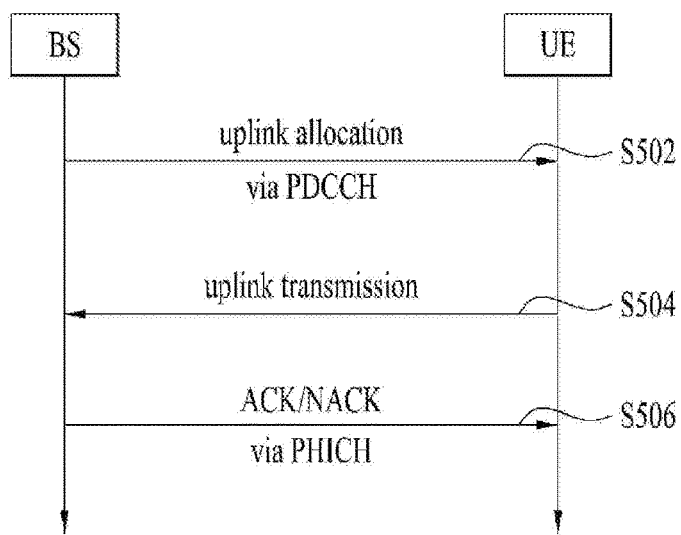
FIG. 9 is a diagram showing a method of transmitting an ACK/NACK signal for uplink data.

FIG. 9 is a diagram showing a method of transmitting an ACK/NACK signal for uplink data in an LTE system. Referring to FIG. 9, a network node (e.g., a BS) transmits uplink allocation information to a UE via a PDCCH (S502). Control information for uplink allocation is also referred to as UL grant and includes resource block allocation information for PUSCH transmission, cyclic shift information for a data demodulation reference signal (DMRS), etc. Thereafter, the UE transmits uplink data (e.g., PUSCH) to the BS according to the uplink allocation information (S504). The BS receives the uplink data from the UE and then transmits an acknowledgement signal (ACK/NACK) for the uplink data to the UE via a PHICH.

A plurality of PHICHs may be mapped to the same resource element (e.g., REG) to configure a PHICH group. Within the same PHICH group, each PHICH is distinguished using an orthogonal sequence. A PHICH resource is identified by an index pair ($n_{PHICH}^{group}, n_{PHICH}^{seq}$). n denotes a PHICH group number, and $n_{PHICH}^{seq}$ denotes an orthogonal sequence index within a PHICH group. $n_{PHICH}^{group}$ and $n_{PHICH}^{seq}$ are identified using cyclic shift of a DMRS transmitted via UL grant and a lowest physical resource block (PRB) index among PRB indices allocated for PUSCH transmission. Equation 1 shows an example of obtaining $n_{PHICH}^{group}$ and $n_{PHICH}^{seq}$.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$

Equation 1 where, $n_{DMRS}$ is mapped from the value of a cyclic shift field for DMRS. $N_{SF}^{PHICH}$ denotes a spreading factor size used for PHICH modulation ($N_{SF}^{PHICH}=2$ or 4). $I_{PRB\_RA}^{lowest\_index}$ denotes a lowest PRB index for PUSCH transmission. $N_{PHICH}^{group}$ denotes the number of PHICH groups. $I_{PHICH}$ has a value of 0 or 1 according to frame or subframe type.

Table 4 shows mapping of $n_{DMRS}$ and a cyclic shift value for a DMRS field.

TABLE 4

| Cyclic Shift for DMRS Field in DCI format | $n_{DMRS}$ |
|---|---|
| 000 | 0 |
| 001 | 1 |
| 010 | 2 |
| 011 | 3 |
| 100 | 4 |
| 101 | 5 |

TABLE 4-continued

| Cyclic Shift for DMRS Field in DCI format | $n_{DMRS}$ |
|---|---|
| 110 | 6 |
| 111 | 7 |

In an FDD frame, the number $N_{PHICH}^{group}$ of PHICH groups is constant in all subframes and the number of PHICH groups in one subframe is shown in Equation 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{Equation 2}$$

where, $N_g \in \{1/6, 1/2, 1, 2\}$ is provided by a higher layer and $N_{RB}^{DL}$ denotes the number of resource blocks (RBs) of a downlink band.

In a TDD frame, the number of PHICH groups may vary according to downlink subframe and is $m_i \cdot N_{PHICH}^{group}$. Table 5 shows $m_i$.

TABLE 5

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

Embodiment: Operation According to DMRS Variance

Figure 10:
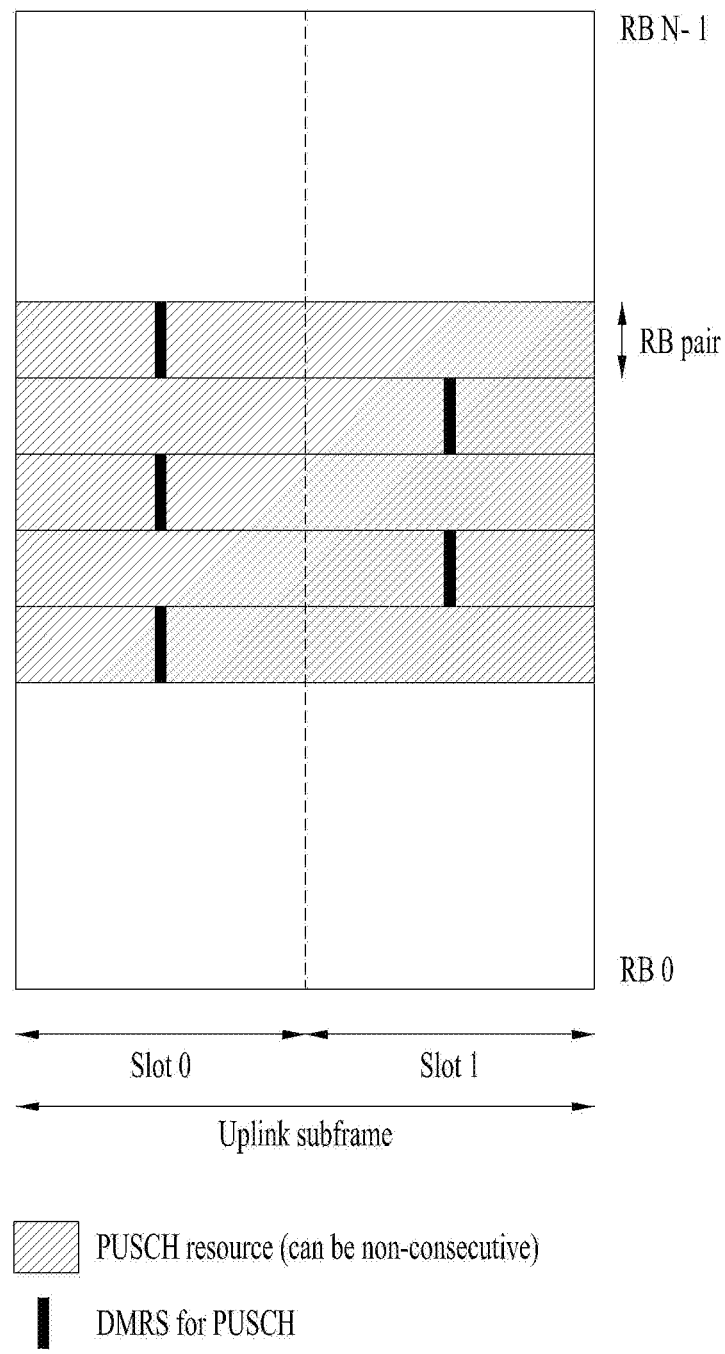
FIGS. 10 to 13 are diagrams showing a DMRS transmission structure according to the present invention.

As shown in FIG. 10, in a legacy LTE (3GPP Rel-8/9) and LTE-A (3GPP Rel-10/11) system, a PUSCH which is a UL data channel has a structure in which one DMRS symbol is transmitted per slot, that is, two DMRS symbols are transmitted per RB, within one RB pair. In a future system, a method of controlling (e.g., reducing or increasing) DMRS resources according to UE situation for the purpose of enhancing spectral efficiency and improving cell coverage may be considered (that is, DMRS variance). Hereinafter, UE operation when DMRS resources vary will be focused upon and operation corresponding thereto may be performed in a BS.

First, the case in which DMRS resources are reduced (that is, reduced DMRS) will be focused upon. In the present invention, reduced DMRS includes slot-based reduced DMRS and comb-based reduced DMRS. Slot-based reduced DMRS indicates a structure in which one DMRS symbol is transmitted per RB pair (that is, only one DMRS symbol is transmitted in one specific slot). Comb-based DMRS indicates a structure in which DMRSs are transmitted using subcarriers discontinuously allocated within one SC-FDMA symbol. An RE/subcarrier set to which a DMRS sequence is mapped within one SC-FDMA symbol may be referred to as DMRS-comb and the other RE/subcarrier set (that is, an RE/subcarrier set to which a DMRS is not mapped) may be referred to as non-DMRS-comb.

Resource Mapping

When slot-based reduced DMRS is applied, in consideration of allocation of a plurality of consecutive RB pairs in the frequency domain for PUSCH transmission, switching slots, in which DMRS symbols are transmitted, between adjacent RB pairs may be efficient in terms of channel estimation performance of an interpolation based channel. Accordingly, when reduced DMRS is applied, sequentially switching slots, in which DMRS symbols are transmitted, according to RB index is proposed. FIG. 10 shows a reduced DMRS transmission structure according to the present invention. Here, an RB index may indicate an RB index of a first slot or an RB index of a second slot configuring an RB pair. Here, the RB index may be a cell-specific RB index based on whole system bandwidth (BW) or a UE-specific RB index based on a PUSCH resource allocation region. In the former case, if it is assumed that the whole system BW includes N RBs, all RBs may be indexed by 0 to N−1 and then a DMRS symbol may be transmitted only via a first slot in an RB having an even index and may be transmitted only via a second slot in an RB having an odd index. In the latter case, if it is assumed that K RBs are allocated for PUSCH transmission, K RBs may be indexed by 0 to K−1 and then a DMRS symbol may be transmitted only via a first slot in an odd-numbered RB in order of RB indices and may be transmitted only via a second slot in an even-numbered RB. Here, the first slot and the second slot may correspond to an even-slot and an odd-slot, respectively.

Figure 11:
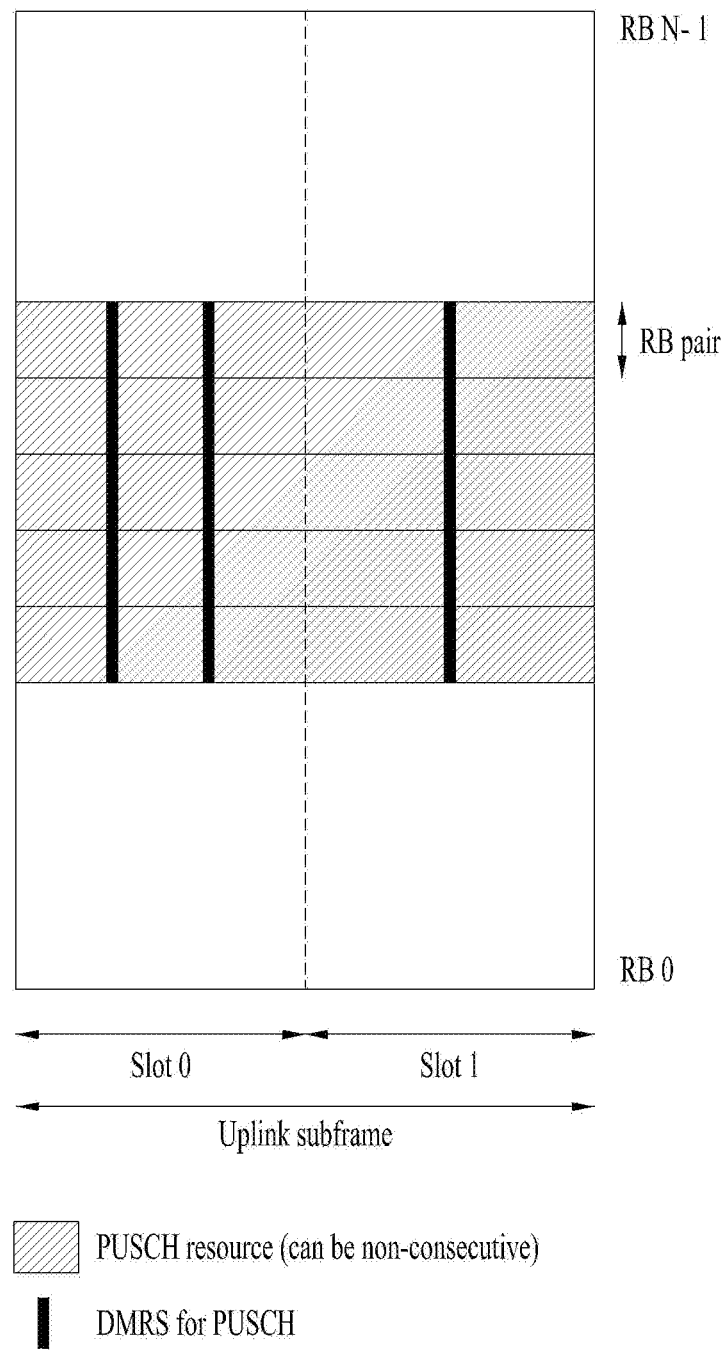

Similarly, when slot-based increased DMRS is applied, the number/locations of DMRS symbols transmitted via each slot may be sequentially switched according to RB index. FIG. 11 shows an increased DMRS transmission structure according to the present invention. Referring to FIG. 11, when three DMRS symbols are transmitted in one RB pair, two DMRS symbols may be transmitted via a first slot and one DMRS symbol may be transmitted via a second slot in an odd-numbered RB in order of RB indices and one DMRS symbol may be transmitted via a first slot and two DMRS symbols may be transmitted via a second slot in an even-numbered RB.

Figure 12:
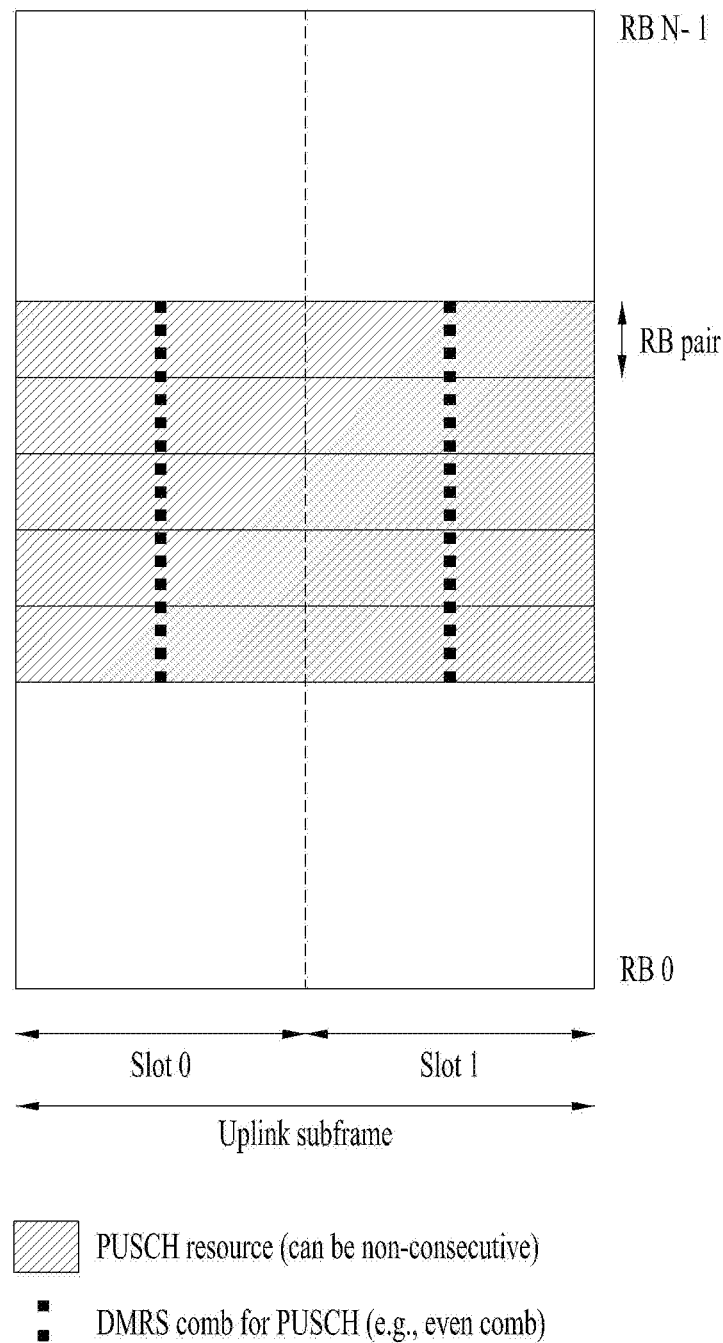

Comb-based DMRS is applicable in a state of maintaining the number of DMRS symbols, that is, two DMRS symbols per RB pair (that is, one DMRS symbol per slot) as in a conventional method. FIG. 12 shows comb-based DMRS. Referring to FIG. 12, DMRSs may be transmitted in an RE (that is, even-comb) corresponding to the subcarrier of an even index or an RE (that is, odd-comb) corresponding to the subcarrier of an odd index within the SC-FDMA symbol in a state of maintaining the number of DMRS symbols. Here, the even-comb may correspond to a set of (2k−1)-th subcarriers within one SC-FDMA symbol and the odd-comb may correspond to a set of 2k-th subcarriers within one SC-FDMA symbol (k=1, 2, . . . , N). Here, N denotes the number of subcarriers allocated for PUSCH transmission.

When comb-based DMRS is applied and UCI is piggybacked on a PUSCH, A/N may be mapped/transmitted to/in a non-DMRS-comb (that is, an RE set to which a DMRS is not mapped). For example, A/N may be sequentially mapped/transmitted to/in a symbol closest to a DMRS symbol and a non-DMRS-comb over all RBs stating from a last subcarrier. When comb-based DMRS is applied and UCI is piggybacked on a PUSCH, CQI/PMI may be mapped/transmitted to/in a non-DMRS-comb. For example, CQI/PMI may be sequentially mapped/transmitted to/in a non-DMRS symbol and a non-DMRS-comb over all RBs stating from a first subcarrier.

Figure 13:
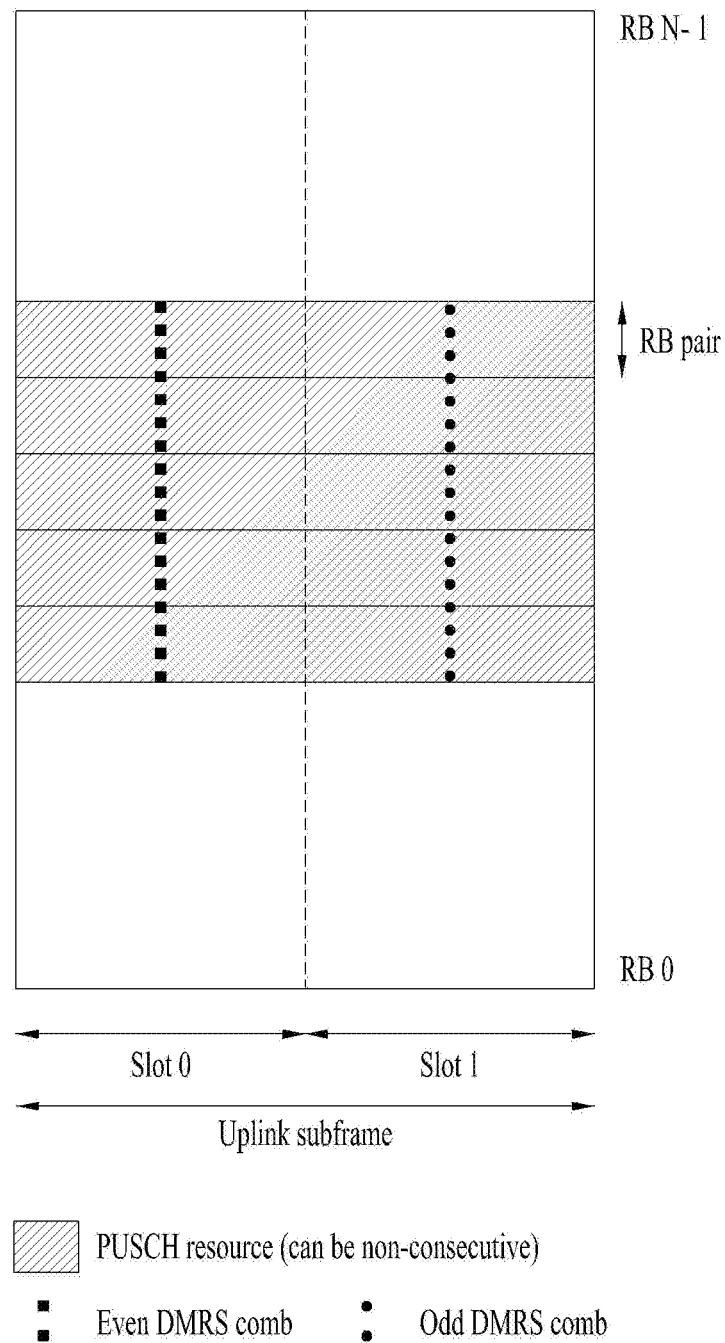

In addition, in comb-based DMRS, combs, in which DMRS is transmitted, may be sequentially switched according to RB index and/or slot index. FIG. 13 shows comb-based DMRS. Referring to FIG. 13, an even-comb may be used for DMRS transmission in an odd-numbered RB in order of RB indices and an odd-comb may be used for DMRS transmission in an even-numbered RB. As another example, an even-comb may be used for DMRS transmission in a first slot and an odd-comb may be used for DMRS transmission in a second slot. Here, the first slot and the second slot may correspond to an even-slot and an odd-slot, respectively.

When comb-based DMRS is applied, data (and/or UCI) may be defined/set to or not to be mapped/transmitted to/in a non-DMRS-comb within the DMRS symbol, for multi-UE multiplexing increase and inter-UE/cell interference mitigation. In addition, regardless of data mapping allowance, UCI may always be defined/set to never be mapped to a non-DMRS-comb. In addition, regardless of data mapping allowance, when UCI is piggybacked, UCI (and/or data) may be defined/set to never be mapped to a non-DMRS-comb. Comb-based DMRS is applicable to a PUSCH for a similar purpose (that is, multi-UE multiplexing increase and inter-UE/cell interference mitigation). Even in this case, UCI may not be mapped/transmitted to/in a non-DMRS-comb.

PHICH Resource Determination

When reduced DMRS is applied, different PHICH resource indices may be allocated/transmitted according to a slot/comb, in which a DMRS symbol/signal is transmitted, for multiplexing of multiple UEs. For example, when slot-based reduced DMRS is applied, if a DMRS symbol is transmitted via a first slot (in all RB sets or a specific RB (e.g., an RB having a lowest index) within a region allocated as PUSCH resources), it is possible to calculate a PHICH resource index using the same method (see Equation 1) as the conventional method. In contrast, when a DMRS symbol is transmitted via a second slot, a PHICH resource index may be determined by adding a (specified/set) offset to a PHICH index calculated using the conventional method. As another example, when comb-based DMRS is applied, if a DMRS is transmitted via an even-comb (in all RB sets or a specific RB (e.g., an RB having a lowest index) within a region allocated as PUSCH resources), it is possible to calculate a PHICH resource index using the same method as the conventional method. In contrast, when a DMRS is transmitted via an odd-comb, a PHICH resource index may be determined by adding a (specified/set) offset to a PHICH index calculated using the conventional method. Here, the offset may be set via RRC/MAC signaling. In addition, the offset may be indicated using a PDCCH (UL grant).

Here, the offset may be an offset for a PHICH sequence index (that is, orthogonal sequence index), a PHICH group number or a DMRS cyclic shift value. The offset value may be specified/set to 1 or −1 (when only one transport block is scheduled and/or scheduling is performed via DCI format 0). In addition, the offset value may be specified/set to 2 or −2 (when two transport blocks are scheduled and/or scheduling is performed via DCI format 4). In addition, (without separately defining a slot/index to which an offset is applied) whether an offset is applied may be dynamically signaled via UL grant in a state of pre-specifying/setting the offset. As another method, in a state of pre-specifying/setting a plurality of offset values via higher layer (e.g., RRC) signaling, which of a plurality of offset values is applied may be dynamically signaled via UL grant. When a PHICH offset is indicated via UL grant, a new field may be added to UL grant (e.g., DCI format 0/4) to indicate the offset or an existing field of UL grant may be borrowed to indicate the offset. The offset may be implicitly estimated via value(s) signaled via specific existing field(s) (e.g., DMRS cyclic shift) of UL grant or a combination thereof (for convenience, signaling is referred to as "PHICH indicator").

For example, the PHICH resource may be determined using the offset as follows.

$$n_{PHICH}^{group} = (I_{PRB\_RA}^{lowest\_index} + n_{DMRS} + O) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS} + O) \bmod 2N_{SF}^{PHICH} \quad \text{Equation 3}$$

where, O indicates an offset.

In addition, a PHICH resource may be indicated via RRC/MAC/PDCCH signaling. In this case, in the above description, the offset may be replaced with a PHICH resource.

In addition, the PHICH resource index may be determined using a function of slots/combs. For example, the PHICH resource may be determined using the offset as follows.

$$n_{PHICH}^{group} = (I_{PRB\_RA}^{lowest\_index} + n_{DMRS} + f_1(\cdot)) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS} + f_2(\cdot)) \bmod 2N_{SF}^{PHICH} \quad \text{Equation 4}$$

where, $f_1(\cdot)$ denotes a function having a slot/comb index as a parameter and $f_2(\cdot)$ denotes a function having a slot/comb index as a parameter. For example, $f_1(\cdot) = f_2(\cdot) =$ slot index (or comb index) and the slot index (or the comb index) may be κ or 1. In addition, $f_1(\cdot) = f_2(\cdot)$ may be given as follows.

TABLE 6

| | Slot index (or Comb index) | |
|---|---|---|
| | 0 | 1 |
| DCI format 0 | a (e.g., 1) | b (e.g., −1) |
| DCI format 4 | c (e.g., 2) | d (e.g., −2) | where, DCI format 0 may be replaced with the case of setting a transmission mode maximally supporting one transport block and DCI format 4 may be replaced with the case of setting a transmission mode maximally supporting two transport blocks.

In addition, in DCI format 0 (or the case of setting a transmission mode maximally supporting one transport block), the offset (e.g., $f_1(\cdot) = f_2(\cdot)$) may be set to 0. In DCI format 4 (or the case of setting a transmission mode maximally supporting two transport blocks), PHICH resource allocation may be controlled using the PHICH indicator.

Signaling

When reduced DMRS is applied, one of the following may be semi-statically configured via radio resource control (RRC)/medium access control (MAC) signaling or may be dynamically configured via UL grant (PDCCH/enhanced PDCCH (EPDCCH)).

which of reduced DMRS and legacy DMRS is applied
which of slot-based reduced DMRS and comb-based DMRS is applied
via which of an even/odd slot the DMRS is transmitted
via which of an even/odd comb the DMRS is transmitted When the DMRS structure is indicated via UL grant (e.g., DCI format 0/4), a new field may be added to UL to indicate the above information or an existing field in UL grant may be borrowed to indicate the above information. In addition, the above information may be implicitly estimated via value(s) signaled via existing specific field(s) in UL grant (e.g., DMRS cyclic shift) or a combination thereof (for convenience, such signaling is referred to as a DMRS indicator).

As in Table 3, in case of a PUSCH, a real DMRS cyclic shift value (that is, DCS) and orthogonal cover code (OCC) information to be applied per layer may be determined according to DMRS cyclic shift field value signaled via UL grant DCI format (e.g., format 0/4). In the present invention, when reduced DMRS is configured, an OCC is not applied to the DMRS and, instead, two different OCCs, that is, [1, 1] and [1, −1], may be used as a 1-bit DMRS indicator or a 1-bit PHICH indicator. For example, the DMRS (corresponding to each layer) may be transmitted via different slots/combs (e.g., even-slot or odd-slot; even-comb or odd-comb) depending on whether the OCC is [1, 1] or [1, −1]. In addition, the DMRS (corresponding to each layer) may be transmitted by applying different DMRS structures (e.g., reduced DMRS or legacy DMRS; slot-based reduced DMRS or comb-based DMRS) depending on whether the OCC for a specific layer (e.g., a first layer) is [1, 1] or [1, −1]. In addition, different PHICH offset values may be applied or whether a (pre-specified/set) PHICH offset is applied may be determined depending on whether the OCC for a specific layer (e.g., a first layer) is [1, 1] or [1, −1].

For example, when reduced DMRS is applied, Table 3 may be modified as follows. The same is true when comb-based DMRS is applied. For example, when comb-based DMRS is used, in Table, slot #0/slot #1 may be replaced with even-comb/odd-comb (or odd-comb/even-comb), respectively.

TABLE 4

| CS Field in uplink-related DCI format | $n_{DMRS,\lambda}^{(2)}$ | | | | DMRS indicator | | | |
|---|---|---|---|---|---|---|---|---|
| | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 6 | 3 | 9 | slot#0 | slot#0 | slot#1 | slot#1 |
| 001 | 6 | 0 | 9 | 3 | slot#1 | slot#1 | slot#0 | slot#0 |
| 010 | 3 | 9 | 6 | 0 | slot#1 | slot#1 | slot#0 | slot#0 |
| 011 | 4 | 10 | 7 | 1 | slot#0 | slot#0 | slot#0 | slot#0 |
| 100 | 2 | 8 | 5 | 11 | slot#0 | slot#0 | slot#0 | slot#0 |
| 101 | 8 | 2 | 11 | 5 | slot#1 | slot#1 | slot#1 | slot#1 |
| 110 | 10 | 4 | 1 | 7 | slot#1 | slot#1 | slot#1 | slot#1 |
| 111 | 9 | 3 | 0 | 6 | slot#0 | slot#0 | slot#1 | slot#1 |

As another method, when slot-based reduced DMRS is applied, the DMRS symbol transmitted via the first slot and the DMRS symbol transmitted via the second slot may be respectively multiplied by 1 and 1 if the OCC is [1, 1] and by 1 and −1 if the OCC is [1, −1]. In addition, when comb-based reduced DMRS is applied, the same comb (e.g., even-comb) is used in the first and the second slots if the OCC is [1, 1] and different combs (the even-comb in the first slot and the odd-comb in the second slot) may be used in the first and second slots if the OCC is [1, −1].

As another method, when slot/comb-based DMRS (and/or legacy DMRS) is applied, the OCC is applicable to an RB domain instead of a slot domain. For example, if the OCC is [1, 1], the DMRS transmitted via an odd-numbered RB pair in order of RB indices and the DMRS transmitted in an even-numbered RB pair are respectively multiplied by 1 and 1 and, if the OCC is [1, −1], the DMRS transmitted via an odd-numbered RB pair in order of RB indices and the DMRS transmitted in an even-numbered RB pair are respectively multiplied by 1 and −1.

In case of reduced DMRS based multi-layer transmission, in consideration of inter-layer interference influence, data (and/or UCI) may be defined/set to never be mapped/transmitted (with respect to all layers) in a symbol in which DMRSs corresponding to at least one or more layers are transmitted or data (and/or UCI) may be defined/set to be mapped/transmitted (with respect to all layers or specific layer in which a DMRS is not transmitted). In addition, regardless of data mapping allowance, UCI may always be defined/set to never be mapped/transmitted (with respect to all layers) in the symbol in which DMRSs corresponding to at least one or more layers are transmitted). In addition, regardless of data mapping allowance, when UCI is piggybacked, UCI (and/or data) may be defined/set to never be mapped/transmitted (with respect to all layers) in the SC-FDMA symbol.

As another method, even when reduced DMRS is configured, in order to prevent deterioration of UCI transmission performance, instead of reduced DMRS, the legacy DMRS structure (FIG. 8) may be maintained/used in a PUSCH on which CSI and/or A/N are piggybacked. That is, reduced DMRS is applicable to a PUSCH on which UCI is not piggybacked (that is, a PUSCH on which only UL-SCH data is transmitted). Alternatively, in a PUSCH on which UCI is piggybacked, instead of reduced DMRS, the legacy DMRS structure (FIG. 8) may be maintained/used only with respect to an RB (pair), in which CSI and/or A/N is transmitted. That is, the reduced DMRS structure is applicable to only the RB (pair), in which CSI and/or A/N is not transmitted. The above method is equally applicable to a PUSCH in which an aperiodic CSI request is triggered (that is, a PUSCH in which an aperiodic CSI report is indicated).

In addition, even when increased DMRS is configured, in order to reduce UL data loss due to increase in symbols/resources occupied by UCI and DMRS, in the PUSCH on which CSI and/or A/N is piggybacked, instead of increased DMRS, the legacy DMRS structure (FIG. 8) may be maintained/used. That is, increased DMRS is applicable to a PUSCH on which UCI is not piggybacked (that is, a PUSCH on which only UL-SCH data is transmitted). Alternatively, in a PUSCH on which UCI is piggybacked, instead of increased DMRS, the legacy DMRS structure (FIG. 8) may be maintained/used only with respect to an RB (pair), in which CSI and/or A/N is transmitted. That is, the increased DMRS structure is applicable to only the RB (pair), in which CSI and/or A/N is not transmitted. The above method is equally applicable to a PUSCH in which an aperiodic CSI request is triggered (that is, a PUSCH in which an aperiodic CSI report is indicated).

Even when reduced DMRS (and/or increased DMRS) is configured, in consideration of RRC reconfiguration and backward compatibility, control overhead, performance loss, etc., the legacy DMRS structure may be maintained/used in at least one of the following.

1) PUSCH scheduled by a PDCCH (UL grant) transmitted from a common search space (CSS).
2) PUSCH scheduled based on semi-persistent scheduling (SPS)
3) PUSCH scheduled via random access response (RAR)
4) Retransmitted PUSCH
5) Rate-matched PUSCH for SRS transmission/protection
    Although second slot based reduced DMRS is configured to be applied to the rate-matched PUSCH, first slot-based reduced DMRS may be applied to the rate-matched PUSCH (in consideration of channel estimation performance and/or UCI piggybacking). In the other case, the second slot based reduced DMRS is applicable according to configuration.

Power Control

In contrast to reduced DMRS, transmission of three or more DMRS symbols in one RB pair (or two or more DMRS symbols in at least one slot) (that is, increased DMRS) may be considered. When UL maximum power limitation is reached (that is, the transmit power of the UE exceeds the maximum power allowance value of the UE) in a state in which reduced/legacy/increased DMRS based PUSCHs (and/or PUCCHs) are simultaneously transmitted, power control protection priority may be given according to DMRS density. In this case, the power of a PUSCH/PUCCH having lower protection priority may be preferentially reduced or transmission of PUSCH/PUCCH having lower protection priority may be abandoned. In addition, when a PUSCH on which UCI is piggybacked is determined in a state in which reduced/legacy/increased DMRS based PUSCHs (and/or PUCCHs) are simultaneously transmitted, UCI container selection priority may be given according to DMRS density. In this case, UCI piggybacking may be performed via a PUSCH having higher selection priority. For example, the power control protection priority and UCI container selection priority may be given according to UE situation.

reduced DMRS>legacy DMRS>increased DMRS,
increased DMRS>legacy DMRS>reduced DMRS,
reduced/increased DMRS>legacy DMRS, or
legacy DMRS>reduced/increased DMRS.

UE maximum power (hereinafter, $P_{max,UE}$), cell-group maximum power (hereinafter, $P_{max,cgp}$) and cell maximum power (hereinafter, $P_{max,c}$) may be set with respect to one UE. Maximum power limitation may occur when the transmit power of channel(s)/signal(s) exceeds at least one of UE maximum power ($P_{max,UE}$), cell-group maximum power ($P_{max,cgp}$) and cell maximum power ($P_{max,c}$). Cell-group maximum power ($P_{max,cgp}$) and cell maximum power are set when carrier aggregation is supported and the cell corresponds to a component carrier. Although not limited thereto, a UL power control process may include 1) controlling a sum of channel/signal transmit powers in one cell per cell to be equal to or less than cell maximum power ($P_{max,c}$), 2) controlling a total sum of channel/signal transmit powers within one cell group per cell group to be equal to or less than cell-group maximum power ($P_{max,cgp}$) and 3) controlling a total sum of channel/signal transmit powers within the whole cell (group) group to be equal to or less than UE maximum power ($P_{max,UE}$). Various methods may be used in order to reduce the transmit power of a channel/signal having lower protection priority. For example, assume that the transmit power of a channel/signal having high protection priority is $P_A$ and the transmit power of a channel/signal having low protection priority is $P_B$. In this case, if $P_A+P_B>P_{max,UE}$, the UE may reduce $P_B$ to $P_B'$ or may set $P_B$ to 0. $P_B'$ may be $\alpha*P_B$, $P_B-\beta$ or $\alpha*P_B\pm\beta$. Here, the unit of the power value may be a linear-scale value or a log-scale value, $0\leq\alpha<1$ and $\beta$ is a positive real number. For example a value a satisfying $P_A+\alpha*P_B\leq P_{max,UE}$ may be determined.

When the UE should reduce the transmit power of a PUSCH, to which a specific DMRS structure (e.g., reduced DMRS, legacy DMRS or increased DMRS) is applied, in a state of reaching maximum power limitation, the power of a non-DMRS symbol may be preferentially reduced rather than the power of a DMRS symbol in order to prevent performance deterioration of channel estimation. Alternatively, (when reduced DMRS is applied), the power of the non-DMRS slot is preferentially reduced rather than the power of the DMRS slot or (when increased DMRS is applied) the power of a slot having a smaller number of DMRS symbols may be preferentially reduced rather than the power of a slot having a larger number of DMRS symbols. The same is true when reducing the transmit power of a PUCCH, to which a specific DMRS structure (e.g., reduced DMRS, legacy DMRS or increased DMRS) is applied.

As another method, in order to improve channel estimation performance (and/or coverage), a transmit power offset or ratio between a DMRS symbol and a non-DMRS symbol configuring a PUSCH and/or a PUCCH may be configured (via RRC signaling). A UE may differently calculate/determine the transmit powers of a DMRS symbol and a non-DMRS symbol configuring a PUSCH/PUCCH according to the transmit power offset/transmit power ratio. For example, the UE may perform power control as follows upon reaching UL maximum power limitation.

1) The power of the DMRS symbol and the power of the non-DMRS symbol are simultaneously reduced while the transmit power offset or ratio is maintained, 2) The power of the DMRS symbol and the power of the non-DMRS symbol are reduced by the same ratio, 3) The power of the non-DMRS symbol is preferentially reduced or 4) The power of the DMRS symbol is preferentially reduced and the total power is controlled to be not less than the power of the non-DMRS symbol.

Figure 14:
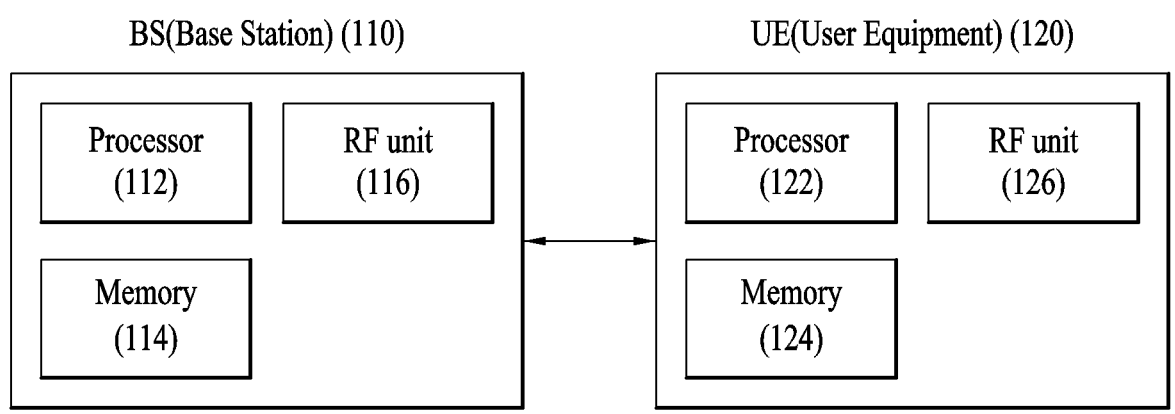
FIG. 14 is a diagram showing a base station (BS) and a user equipment (UE) to which the present invention is applicable.

FIG. 14 is a diagram showing a base station (BS) and a user equipment (UE) to which the present invention is applicable. In a system including a relay, the BS or UE may be replaced with the relay.

Referring to FIG. 14, a wireless communication system includes a BS 110 and a UE 120. The BS 110 includes a processor 112, a memory 114, and a Radio Frequency (RF) unit 116. The processor 112 may be configured so as to implement the procedures and/or methods proposed in the present invention. The memory 114 is connected to the processor 112 and stores various pieces of information related to operations of the processor 112. The RF unit 116 is connected to the processor 112 and transmits and/or receives RF signals. The UE 120 includes a processor 122, a memory 124, and an RF unit 126. The processor 122 may be configured so as to implement the procedures and/or methods proposed in the present invention. The memory 124 is connected to the processor 122 and stores various pieces of information related to operations of the processor 122. The RF unit 126 is connected to the processor 122 and transmits and/or receives RF signals. The BS 110 and/or the UE 120 may have a single antenna or multiple antennas.

The embodiments of the present invention described hereinabove are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It will be apparent that some claims referring to specific claims may be combined with another claims referring to the other claims other than the specific claims to constitute an embodiment or add new claims by means of amendment after the application is filed.

In this document, the embodiments of the present invention have been described centering on a data transmission and reception relationship between a UE and a BS. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc. The term terminal may be replaced with the terms user equipment (UE), mobile station (MS), mobile subscriber station (MSS), etc.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a wireless communication device such as a UE, a relay, a BS, etc.

What is claimed is:

1. A method for receiving control information by a user equipment (UE) in a wireless communication system, the method comprising:
 receiving a physical downlink control channel (PDCCH) signal including an uplink scheduling information;
 transmitting a physical uplink shared channel (PUSCH) signal and a reference signal (RS) for the PUSCH signal using the uplink scheduling information including a cyclic shift field indicating a cyclic shift value of the RS for the PUSCH signal on one or more resource block including a plurality of symbols; and
 receiving a physical hybrid ARQ indicator channel (PHICH) including an acknowledgement information for the PUSCH signal,
 wherein the RS for the PUSCH signal is transmitted on even-numbered subcarriers or odd-numbered subcarriers in a specific symbol of the plurality of symbols,
 wherein whether the RS for the PUSCH signal is transmitted on the even-numbered subcarriers or the odd-numbered subcarriers in the specific symbol of the plurality of the symbols is implicitly indicated based on the cyclic shift value,
 wherein a PHICH resource index determined when the RS for the PUSCH signal is transmitted on the odd-numbered subcarriers is different from a PHICH resource index determined when the RS for the PUSCH signal is transmitted on the even-numbered subcarriers by a offset value.

2. The method of claim 1, wherein the PHICH resource index includes a PHICH group index and a PHICH sequence index.

3. The method of claim 1, wherein the PUSCH signal is transmitted on the plurality of symbols excepting the specific symbol on which the RS for the PUSCH is transmitted.

4. A user equipment (UE) configured to receive a control information in a wireless communication system, the UE comprising:
 a radio frequency (RF) unit; and
 a processor,
 wherein the processor is configured to receive a physical downlink control channel (PDCCH) signal including an uplink scheduling information, to transmit a physical uplink shared channel (PUSCH) signal and a reference signal (RS) for the PUSCH signal using the uplink scheduling information including a cyclic shift field indicating a cyclic shift value of the RS for the PUSCH signal on one or more resource block including a plurality of symbols, and to receive a physical hybrid ARQ indicator channel (PHICH) including an acknowledgement information for the PUSCH signal,
 wherein the RS for the PUSCH signal is transmitted on even-numbered subcarriers or odd-numbered subcarriers in a specific symbol of the plurality of symbols, and
 wherein whether the RS for the PUSCH signal is transmitted on the even-numbered subcarriers or the odd-numbered subcarriers in the specific symbol of the plurality of the symbols is implicitly indicated based on the cyclic shift value,
 wherein a PHICH resource index determined when the RS for the PUSCH signal is transmitted on the odd-numbered subcarriers is different from a PHICH resource index determined when the RS for the PUSCH signal is transmitted on the even-numbered subcarriers by a offset value.

5. The UE of claim 4, wherein the PHICH resource index includes a PHICH group index and a PHICH sequence index.

6. The UE of claim 4, wherein the PUSCH signal is transmitted on the plurality of symbols excepting the specific symbol on which the RS for the PUSCH is transmitted.

* * * * *